United States Patent
Kumar et al.

(10) Patent No.: US 12,525,284 B2
(45) Date of Patent: Jan. 13, 2026

(54) COLUMN SELECT TOPOLOGY SUPPORTING INCREASED THROUGHPUT FOR WRITES TO MEMORY

(71) Applicant: Arm Limited, Cambridge (GB)

(72) Inventors: Akshay Kumar, New Delhi (IN); Edward Martin McCombs, Jr., Austin, TX (US)

(73) Assignee: ARM LIMITED, Cambridge (GB)

( * ) Notice: Subject to any disclaimer, the term of this patent is extended or adjusted under 35 U.S.C. 154(b) by 47 days.

(21) Appl. No.: 18/436,293

(22) Filed: Feb. 8, 2024

(65) Prior Publication Data

US 2025/0259672 A1    Aug. 14, 2025

(51) Int. Cl.
  *G11C 7/00* (2006.01)
  *G11C 11/418* (2006.01)
  *G11C 11/419* (2006.01)

(52) U.S. Cl.
  CPC .......... *G11C 11/419* (2013.01); *G11C 11/418* (2013.01)

(58) Field of Classification Search
  CPC ....... G11C 7/1078; G11C 7/22; G11C 7/1006; G11C 7/1072; G11C 7/1096
  USPC ...................................... 365/189.16, 189.14
  See application file for complete search history.

(56) References Cited

U.S. PATENT DOCUMENTS

| | | | |
|---|---|---|---|
| 6,181,608 B1 | 1/2001 | Keshavarzi et al. | |
| 6,181,612 B1 | 1/2001 | Wada | |
| 6,337,822 B1 * | 1/2002 | Kwak | G11C 7/1006 365/203 |
| 2001/0043482 A1 | 11/2001 | Takeyama et al. | |
| 2017/0345466 A1 * | 11/2017 | Cheon | G11C 7/1045 |
| 2020/0098422 A1 | 3/2020 | Nguyen et al. | |
| 2021/0193196 A1 | 6/2021 | Augustine et al. | |

FOREIGN PATENT DOCUMENTS

WO    2023034370 A1    3/2023

* cited by examiner

*Primary Examiner* — Son T Dinh
(74) *Attorney, Agent, or Firm* — Talem IP Law, LLP

(57) ABSTRACT

A write circuitry may include a first write driver and at least one additional write driver for a set of bitlines coupled to bitcells of a memory; column select circuitry; a first storage element coupled to an input data pin to receive data for storing in the memory; and at least one additional storage element coupled in series with the first storage element. The first storage element and each of the at least one additional storage element are also coupled to a corresponding write driver. The column select circuitry may include a first column select circuitry for the first write driver that selects from a first subset of the set of bitlines; and a second column select circuitry for a second write driver that selects from a second subset of the set of bitlines, where the first subset and the second subset are overlapping sets.

20 Claims, 13 Drawing Sheets

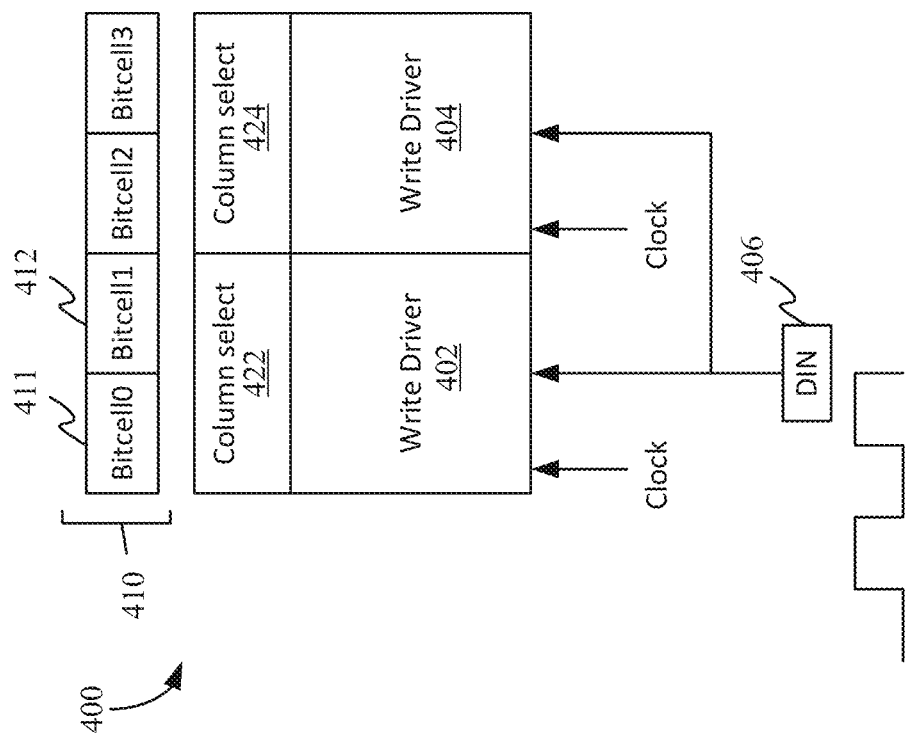
Figure 4B
Figure 5
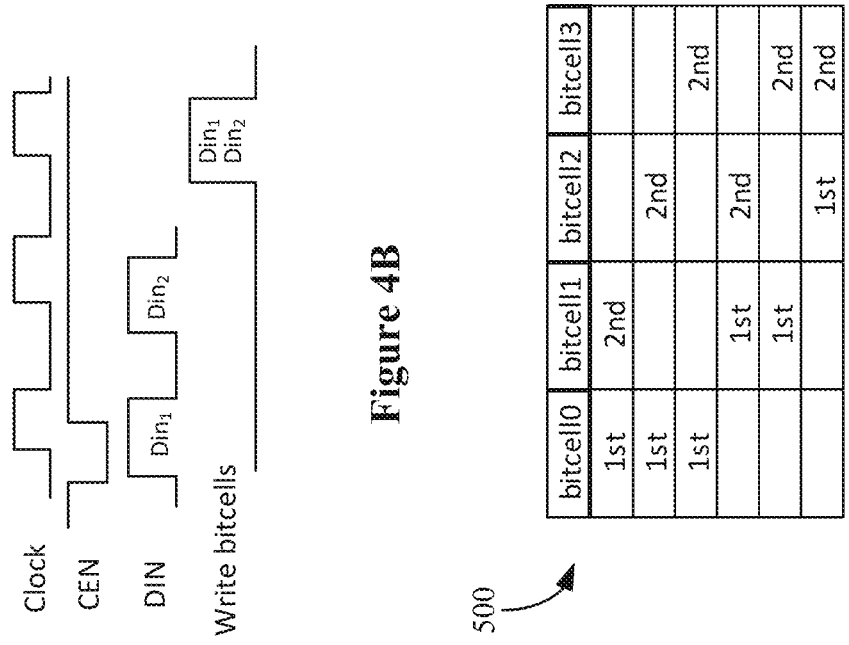
Figure 4A

COLUMN SELECT TOPOLOGY SUPPORTING INCREASED THROUGHPUT FOR WRITES TO MEMORY

BACKGROUND

Random Access Memory (RAM) is a type of volatile memory typically used as the main or primary memory for a processing unit and stores the programs and data that the processing unit is using during execution of a program. Static Random Access Memory (SRAM) is typically the type of memory used for caches. SRAM is generally configured as an array, or matrix, of memory units that are individually addressable. Read and write operations are performed on units of data referred to as words. That is, a word refers to a unit of data used by a particular processor design or instruction set.

In general, wordlines are used to select a row for reading or writing and bitlines carry data to/from a column. For the read operation in SRAM, the address of a storage location for a word is transferred to an address line, a pre-charge circuit is used to bring bitlines to VDD, the wordline is driven high (pre-charge circuit is turned off), the cells storing the data at the storage location pull down one bitline, and a sense circuit on a periphery of the array is activated to capture the value on the bitlines. For the write operation in SRAM, the address of a desired word is transferred to a specific address on the wordline and column, data bits to be stored in the memory are transferred to the bitlines, which are driven by a column driver circuit, and the write control is activated to drive the wordline high (while the column driver stays on) and drive the data into the cells being written.

The speed of a processing unit is determined by how many calculations a processor can perform per clock cycle. However, one limiting factor to the performance of a processing unit is the speed at which the data stored in memory can be read and written. Row and column changes, changing between commands, and other operations can contribute to higher latencies. Identifying mechanisms to reduce the number of clock cycles to deliver data (both to memory as a write operation and to a processing unit as a read operation) continues to be important for performance.

BRIEF SUMMARY

Column select topologies supporting increased throughput for writes to memory are described. An increased throughput refers to the ability to write, read, and access multiple bitcells of a memory in fewer clock cycles compared to the writing, reading, or accessing of the multiple bitcells individually. A "blast mode" is provided in which more than one word is written or read on a given wordline across multiple columns which results in increased throughput. As described in detail herein, for a blast mode write operation, multiple words are written to a row of memory at a same time once the words are loaded, the wordline is on, and the bitlines are pre-charged, thus reducing the number of clock cycles in which the multiple words are written to memory.

In some aspects, a write circuitry for a memory can include a first write driver and at least one additional write driver for a set of bitlines coupled to bitcells of the memory; column select circuitry coupled to the first write driver and the at least one additional write driver for selecting bitlines of the set of bitlines; a first storage element coupled to an input data pin to receive data for storing in the memory; and at least one additional storage element coupled in series with the first storage element, wherein the first storage element and each of the at least one additional storage element are also coupled to output to a corresponding write driver of the first write driver and the at least one additional write driver for the set of bitlines.

In some implementations, the column select circuitry includes a first column select circuitry for the first write driver that selects from a first subset of the set of bitlines; and a second column select circuitry for a second write driver that selects from a second subset of the set of bitlines, where the first subset and the second subset are overlapping sets.

In some aspects, a method of operating a memory circuitry including the write circuitry includes loading up to n words during consecutive clock cycles from an input data pin using the first storage element and the at least one additional storage element, where n is an integer greater than 1; and writing, by at least the first write driver, the up to n words to bitcells of a same row as selected by the column select circuitry. For example, the column select circuitry selectively couples the first write driver to a bitline pair of a subset of bitlines of the set of bitlines and selectively couples the at least one additional write driver to a corresponding additional separate bitline pair of a different corresponding subset of bitlines of the set of bitlines, wherein the subset of bitlines for the first write driver and the different corresponding subset of bitlines for the at least one additional write driver are each a proper subset. Through the described column select circuitry configurations, it is possible to write a first word and a second word (or a third word, etc.) to non-consecutive bitcells of a row.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

BRIEF DESCRIPTION OF THE DRAWINGS

FIGS. 4A and 4B illustrate an example write circuitry supporting n=2 and corresponding timing diagram.

FIG. 5 shows a table illustrating bitcell locations that can be written in an example blast write of two words.

DETAILED DESCRIPTION

Column select topologies supporting increased throughput for writes to memory are described. An increased throughput refers to the ability to write, read, and access multiple bitcells of a memory in fewer clock cycles compared to the writing, reading, or accessing of the multiple bitcells individually. A "blast mode" is provided in which more than one word is written or read on a given wordline across multiple columns which results in increased throughput. As described in detail herein, for a blast mode write operation, multiple words are written to a row of memory at a same time once the words are loaded, the wordline is on, and the bitlines are pre-charged, thus reducing the number of clock cycles in which the multiple words are written to memory.

Figure 1A:
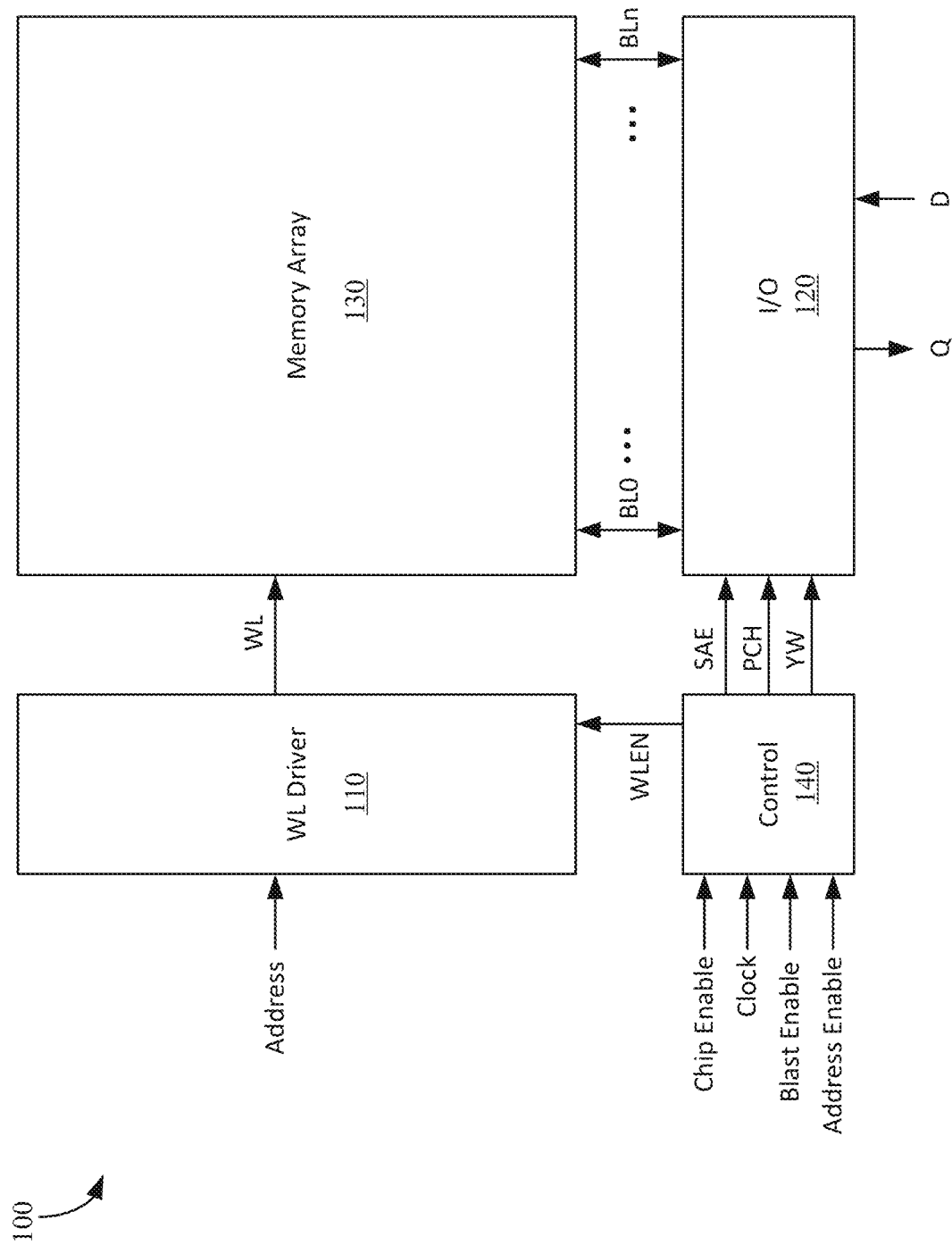
FIG. 1A shows a representational diagram of a memory circuitry.
Figure 1B:
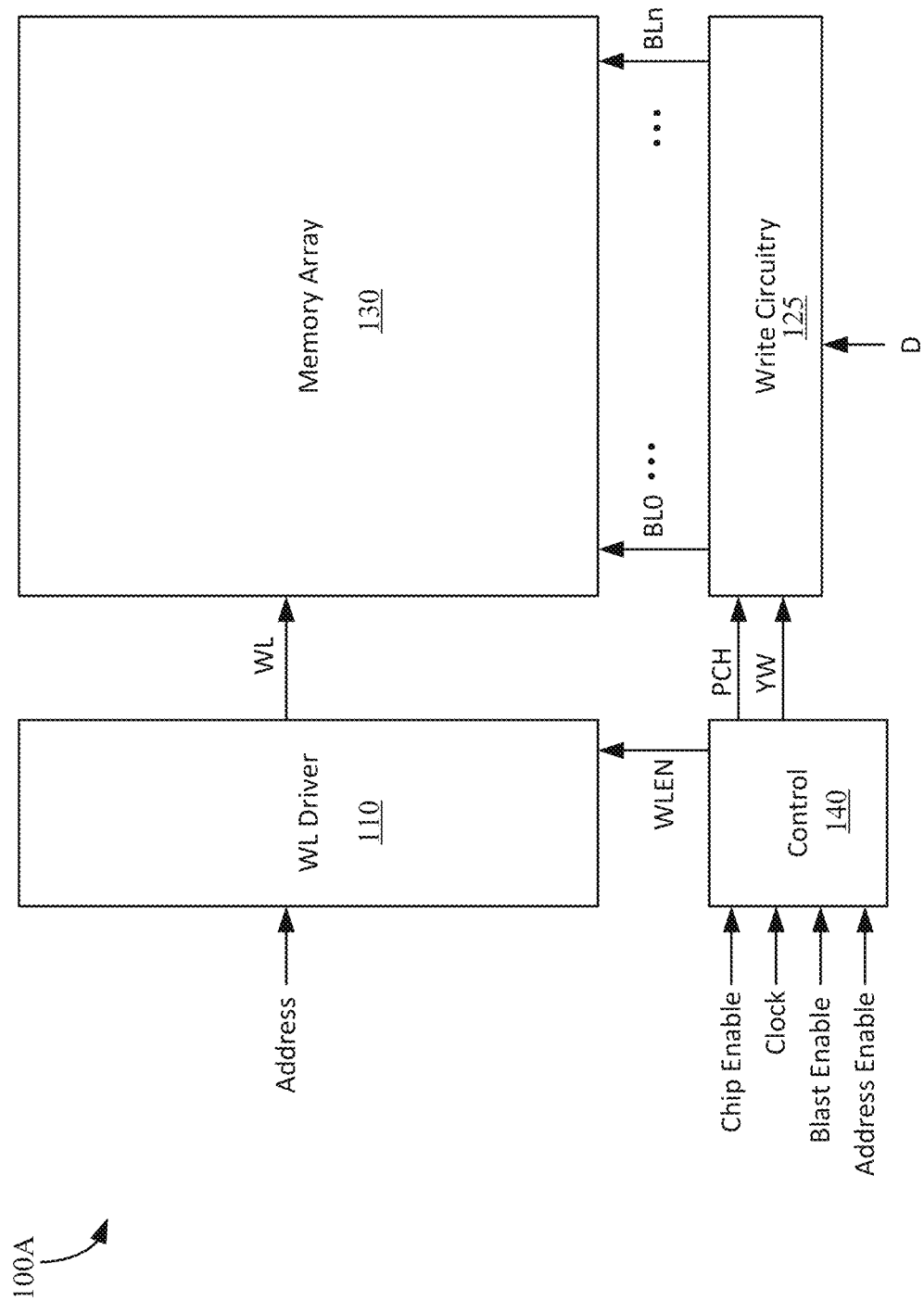
FIG. 1B shows a representational diagram of a memory circuitry for performing write operations.

FIG. 1A shows a representational diagram of a memory circuitry; and FIG. 1B shows a representational diagram of a memory circuitry for performing write operations.

Referring to FIG. 1A, memory circuitry 100 includes a wordline (WL) driver 110 and input/output circuitry 120 for a memory array 130. The WL driver 110 and the input/output circuitry 120 operate under the control of a control circuit 140. In some implementations, the memory circuitry 100 is cache circuitry.

The memory 130 is structured in an array with rows accessed by wordlines and columns accessed by bitlines. In certain implementations, the memory 130 is a static random access memory (SRAM). The structure of each bitcell of the memory can be 1:1:1 bitcells, 1:1:2 bitcells, or 1:2:2 bitcells, as examples. The bitcells may be implemented in FinFET processes, planar processes, nanosheet processes, FDSOI processes, or other suitable technologies. A bitcell refers to the memory element storing a single bit of information.

The control circuit 140 can receive a chip enable signal, a clock signal, a blast enable signal, and an address enable signal and generate outputs to control the WL driver 110 and the I/O circuitry 120. The chip enable signal indicates whether the memory will be accessed or not. The clock signal indicates the start of an operation for memory and provides the operating frequency for the circuitry. The blast enable signal indicates whether the operation being performed at the memory is in blast mode. The address enable signal supports out-of-order bitcell access. Out-of-order bitcell access refers to the ability to write or read (or otherwise access) bitcells on a non-consecutive basis. That is, by using the address enable signal, which indicates which bitlines are going to be accessed during the blast mode, it is possible to have multiple words read or written to non-consecutive bitcells of a row.

The WL driver 110 receives an address and turns on a wordline indicated by the address in response to receiving a wordline enable (WLEN) signal from the control circuit 140.

The input/output circuitry 120 can include write circuitry and read circuitry. Data (D) is received for write operations and Data (Q) is output for read operations. The input/output circuitry 120 receives a sense amplifier enable (SAE) signal, a precharge (PCH) signal, and a write column select (YW) signal from the control circuit 140. In the case of write circuitry 125, the control circuit 140 provides a precharge (PCH) signal and a write column select (YW) signal, as illustrated by the memory circuitry 100A shown in FIG. 1B.

Referring to FIG. 1B, the memory circuitry 100A includes a wordline driver 110 for the memory 130, where the wordline driver 110 is coupled to receive an address and select a corresponding wordline for the memory 130; a write circuitry 125; and a control circuit 140 for operating the wordline driver 110 and the write circuitry 125.

For a blast mode write operation, the control circuit 140 receives a chip enable signal, clock signal, blast enable signal, and address enable signal; and, using the received signals, generates appropriate signals to output the wordline enable (WLEN) signal to the wordline driver 110 and to output the precharge (PCH) signal and the appropriate write column select (YW) signal to the write circuitry 125. In some cases, the control circuit 140 performs the method 300 described with respect to FIG. 3.

In various implementations, the memory circuitry 100, 100A can also be used to perform a conventional write operations. For example, in response to receiving a signal indicative of a conventional write (e.g., when the blast enable signal does not indicate a blast mode), write operations can be performed for writing one word to the memory, where any word written in response to the signal indicative of the conventional write is written in two clock cycles.

Figure 2:
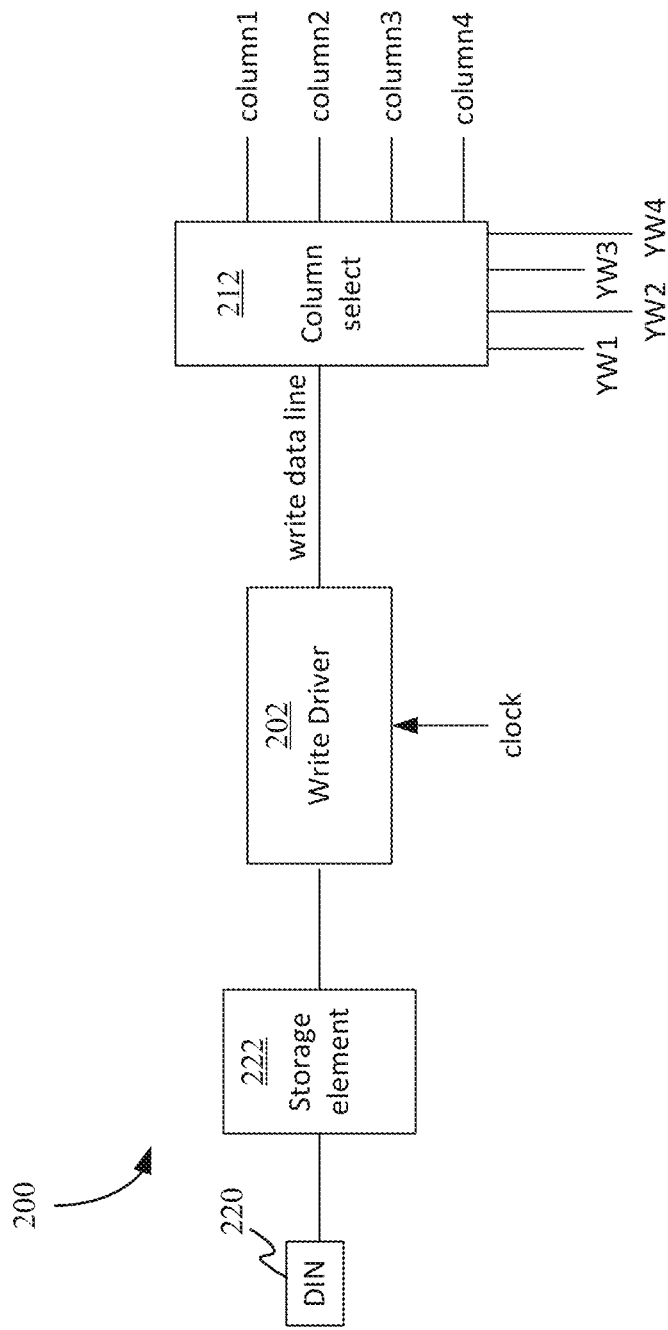
FIG. 2 illustrates an example one-word configuration of write circuitry for a set of bitlines.

FIG. 2 illustrates an example one-word configuration of write circuitry for a set of bitlines. Referring to FIG. 2, in a representative single write implementation, write circuitry 200 includes a write driver 202 and column select circuitry 212 for selecting between four columns (of bitline pairs). In some cases, boost circuitry, also referred to as assist circuitry, is included with the write driver 202 to assist with voltage levels for the writing of the data to the memory. A wordline driver (e.g., wordline driver 110 of FIGS. 1A-1B) turns on the appropriate row/wordline (based on the row address). The column select circuitry 212 is used to select the column/bitline (based on the column address) for the bitcell on the selected appropriate row that is being written to. In the illustrated configuration, the column select circuitry 212 receives signals (YW1, YW2, YW3, YW4) to select one column from four columns coupled to the write driver 202. For a write operation of a single word, the bitlines are precharged and the wordline is turned on during a first clock cycle and the word is loaded from an input pin DIN 220 to a storage element 222 (e.g., a D flip flop). Then, the word is stored in the selected bitcell (as selected by the column select circuitry 212) during the second clock cycle and the wordline is turned off. Thus, generally, drivers set and hold bitlines to desired values, an address decoder activates a particular wordline, and each cell in word is overpowered by the drivers to store the value.

In the representative single write implementation, a single write driver 202 and column select circuitry 212 is coupled to four columns (for access to the bitcells along those columns). It should be noted that more or fewer columns can be accessible by a single driver. For example, some architectures include multiple memory banks and the single driver can be used to access the same number of columns in each of the multiple memory banks. In some architectures, four sets of lines can be accessed by the single driver (e.g., 16 columns instead of just the 4 of the original example). For example, there can be two memory banks, each with duplicate banks (e.g., for 'flexible' bitlines) such as described with respect to FIG. 10.

Figure 3:
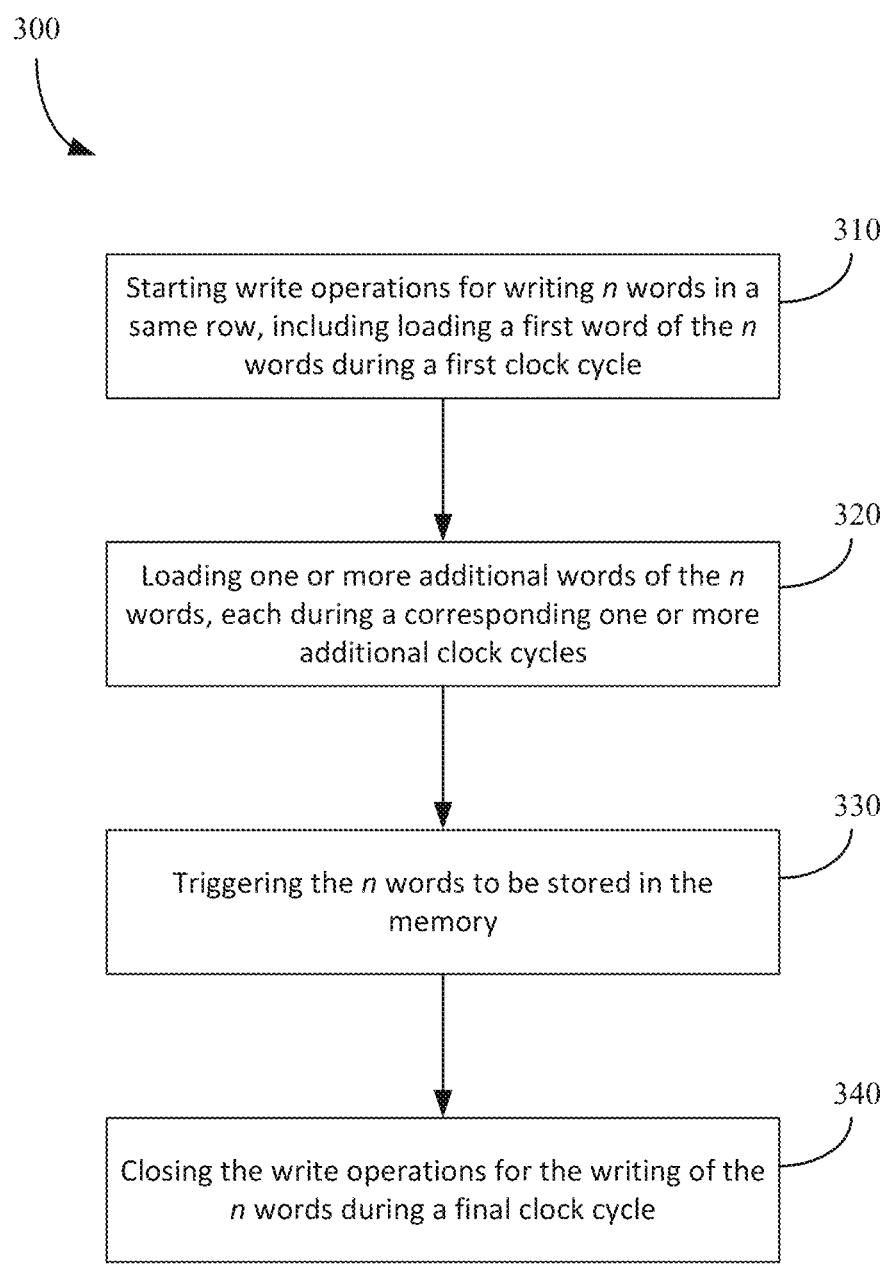
FIG. 3 illustrates a method for write operations to memory for n words in a row.

FIG. 3 illustrates a method for write operations to memory for n words in a row. Referring to FIG. 3, method 300 includes starting (310) write operations for writing n words in a same row, including loading a first word of the n words during a first clock cycle, where n is an integer greater than 1; loading (320) one or more additional words of the n words, each during a corresponding one or more additional clock cycles; triggering (330) the n words to be stored in the memory; and closing (340) the write operations for the writing of the n words during a final clock cycle, whereby the n words are written in n+1 clock cycles consisting of the first clock cycle, the corresponding one or more additional clock cycles, and the final clock cycle.

The starting (310) of the write operations for the writing of n words in the same row can include precharging bitlines of the memory and turning on a wordline. In some cases, the starting (310) of the write operations for the writing of n words in the same row is performed in response to receiving a signal indicative of a blast write, for example, when the blast enable signal received by the control circuit 140 of FIG. 1B indicates the operation is to be a blast operation. The loading of the first word of the n words during the first clock cycle is performed through a data input to the write circuitry (e.g., write circuitry 125 of FIG. 1B).

The loading (320) of one or more additional words of the n words, each during a corresponding one or more additional clock cycles can be performed through the data input to the write circuitry (e.g., write circuitry 125 of FIG. 1B). As described in more detail with respect to FIGS. 6, 8, 9, and 11, a single data input pin to a set of bitlines can be used to load the first word and the one or more additional words during the first clock cycle and corresponding one or more additional clock cycles using cascading storage elements. That is, a first storage element is provided coupled to an input data pin to receive data for storing in the memory; and at least one additional storage element is coupled in series with the first storage element such that the sequence of words to be written can be loaded in preparation of writing to the bitcells. Example timing diagrams of the loading of the n words, including the first word and the one or more additional words include n=2 as shown and described with respect to FIG. 4B and n=3 as shown and described with respect to FIG. 7B.

Figure 10:
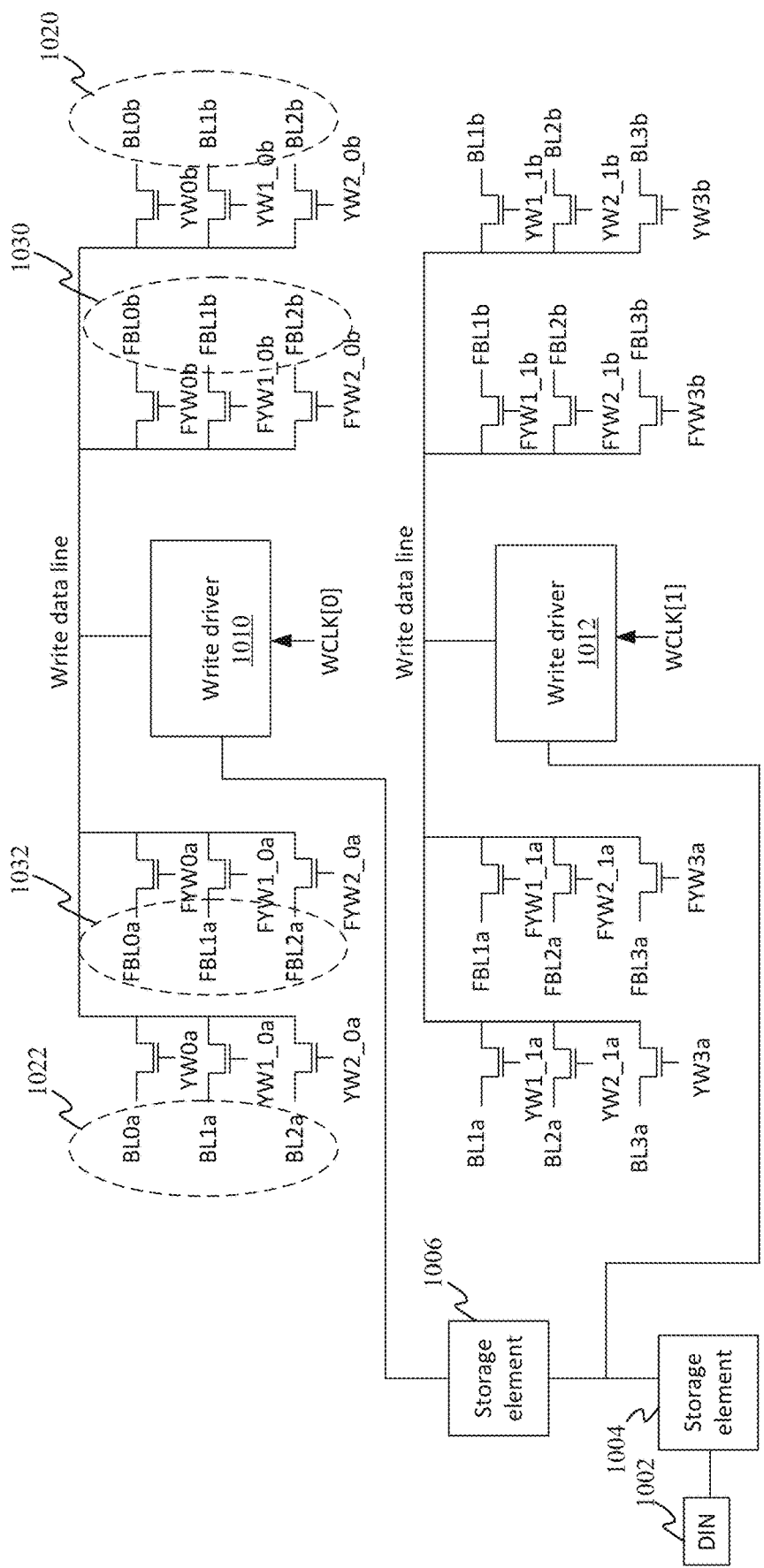
FIG. 10 illustrates an example circuit configuration for write circuitry supporting up to two words in a blast write operation to a multiple memory bank architecture.

The triggering (330) of the n words to be stored in the memory involves various signals associated with the triggering of the n words to be stored in the memory. For example, the various signals can include applying column select signals and any write driver enable signals (including for boost/write assist circuitry when utilized for controlling a level of an internal voltage). Column select signals can be applied to column select circuitry to select a column to write to. Non-limiting example configurations of column select circuitry include 4:1 multiplexer (MUX), 8:1 MUX, 3:1 MUX, and 2:1 MUX. FIG. 10 illustrates an implementation of column select circuitry using pass gate transistors.

Figure 6:
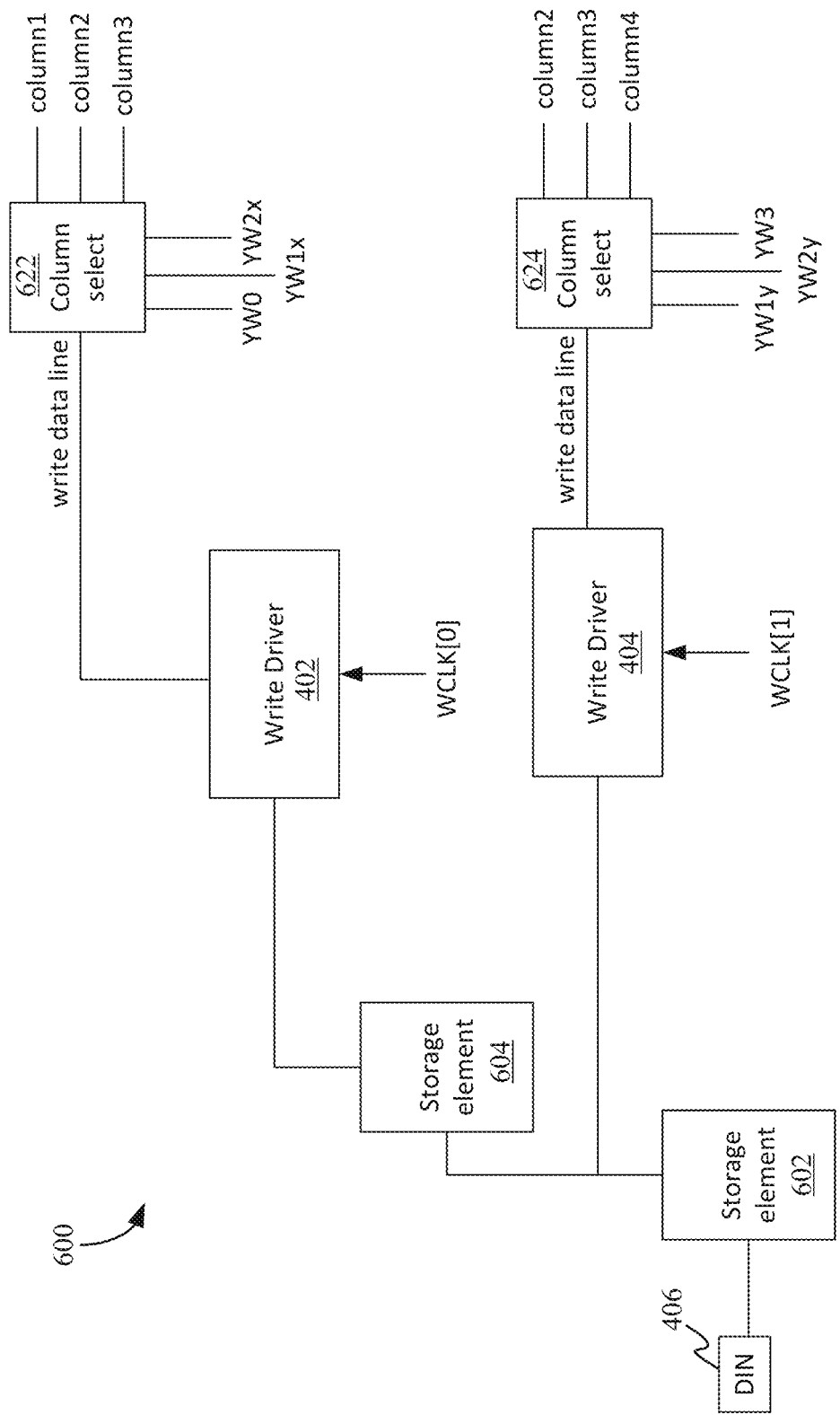
FIG. 6 illustrates an example circuit configuration for write circuitry supporting up to two words in a blast write operation.
Figure 8:
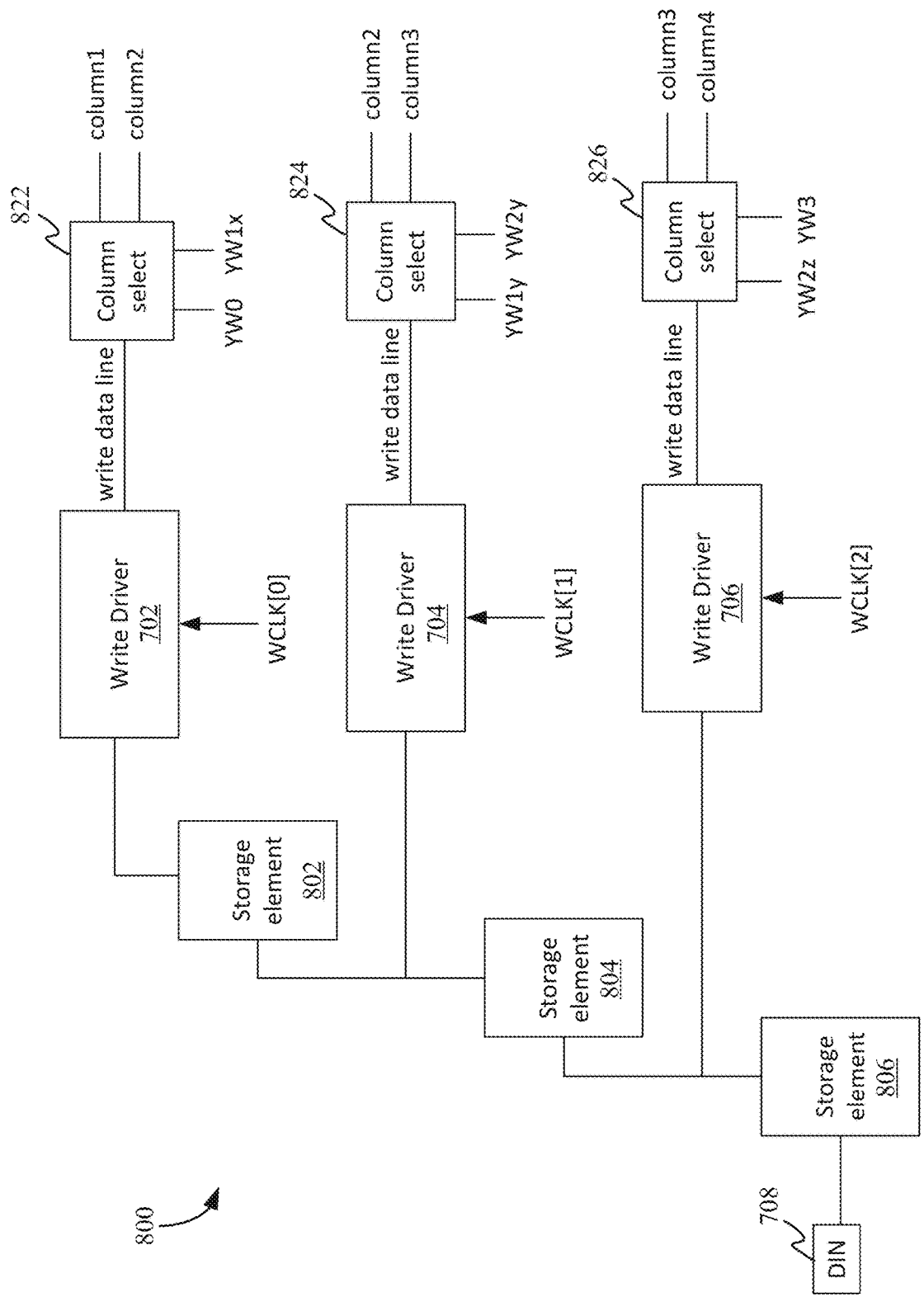
FIG. 8 illustrates an example circuit configuration for write circuitry supporting up to three words in a blast write operation.
Figure 9:
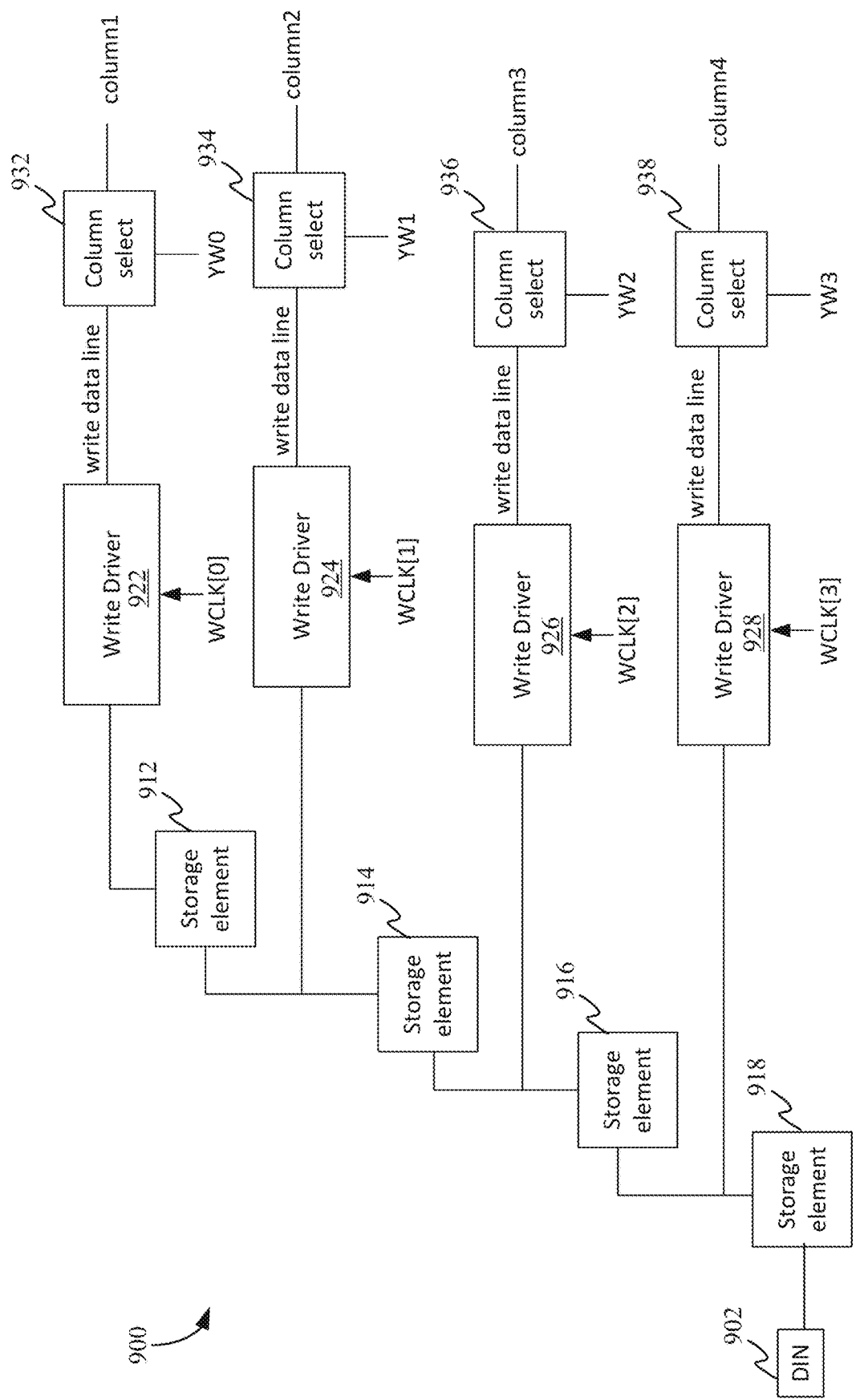
FIG. 9 illustrates an example circuit configuration for write circuitry supporting up to four words in a blast write operation.

As described herein, it is possible for all the words to be stored at the same time through, for example, the inclusion of additional write drivers and corresponding additional column select circuitry for a set of bitlines such as illustrated in FIGS. 4A and 4A. With such a configuration, the n words can be triggered to be stored in the memory during a last clock cycle of the corresponding one or more additional clock cycles such that the n words are concurrently stored during the final clock cycle such as illustrated in FIGS. 4B and 4B. In various implementations optimizing footprint (and parasitic capacitance), such as illustrated in FIGS. 6, 8, and 9, the column select circuitry includes a first column select circuitry coupled to a first write driver for selecting a bitline of a first subset of the set of bitlines; and an additional column select circuitry for each of at least one additional write driver for selecting corresponding bitlines of corresponding subsets of the set of bitlines. Indeed, consider the set of bitlines corresponding to p columns, where p is an integer greater than 1, then the first write driver and the at least one additional write driver can include up to p write drivers with a corresponding number of column select circuitry. Although not shown in the figures, in some cases, boost circuitry is included with each write driver to assist with voltage levels for the writing of the data to the memory. It should be noted that the described circuitry for a set of bitcells/set of bitlines/set of columns may represent a single slice (i.e., one bit deep) of a word.

The closing (340) of the write operations for the writing of the n words can include turning off the wordline and the signals associated with the triggering of the n words to be stored in the memory.

FIGS. 4A and 4B illustrate an example write circuitry supporting n=2 and corresponding timing diagram. Referring to FIG. 4A, a two-word (n=2) configuration 400 for write circuitry 125 can include a first write driver 402 to a set of bitlines and a second write driver 404 to the set of bitlines. The first write driver 402 and the second write driver 404 can each be selectively coupled to all the bitlines of the set of bitlines or subsets (including overlapping subsets) of the bitlines of the set of bitlines. Both the first write driver 402 and the second write driver 404 receive their input through the data input (DIN) 406 for the set of bitlines. In the illustrated scenario, the two-word configuration 400 involves a selection of two bitcells from four bitcells 410 in a same row that are accessible by the set of bitlines coupled to the first write driver 402 and the second write driver 404. To select between the bitcells, column select circuitry is included for each write driver. The column select circuitry can select between one, two, three, or more bitline pairs of the set of bitlines, depending on implementation.

As illustrated in FIG. 4A, the write circuitry can include a first column select circuitry 422 for selecting a particular bitline of the set of bitlines for the first write driver 402 and a second column select circuitry 424 for selecting a corresponding particular bitline of the set of bitlines for the second write driver 404 such that the first word is written to one bitcell (e.g., bitcell 411) coupled to the particular bitline and the second word is written to another bitcell (e.g., bitcell 412) coupled to the corresponding particular bitline. The particular bitline selected by the first column select circuitry 422 is the selected bitline pair (i.e., bitline and bitline bar) for the first write driver 402. The corresponding particular bitline selected by the second column select circuitry 424 is the selected bitline pair for/corresponding to the second write driver 404. The column select circuitry (e.g., first column select circuitry 422, second column select circuitry 424) can be implemented as a MUX. In some cases, the column select circuitry is implemented using pass gates.

Referring to FIG. 4B, for a blast write operation, when a control circuit such as control circuit 140 of FIG. 1A receives a chip enable (CEN) signal indicating a start of the write operations for writing two words in a same row, a first word (Din1) is loaded during the first clock cycle. Then, a second word (Din2) is loaded during the second clock cycle, and the two words (Din1 and Din2) are triggered to be stored in the memory such that both words are concurrently written by the end of the third clock cycle. As can be seen, the write operations for the two words are performed in three clock cycles such that the first word (Din1) of the two words is loaded during the first clock cycle, a second word (Din2) of the two words is loaded during a second clock cycle and the write operations close during a third clock cycle during which the two words are stored in the memory.

FIG. 5 shows a table illustrating bitcell locations that can be written in an example blast write of two words. As reflected in the table 500, it is possible to skip columns during a blast write, providing a non-consecutive write access. As can be seen by the values in table 500, when writing two words in a blast write operation, the second word is not written to the first bitcell (e.g., bitcell0 411) and the first word is not written to the fourth bitcell (e.g., bitcell3). This constraint enables an optimization in which column select circuitry for the first write driver (e.g., first write driver 402 of FIG. 4A) is not needed for accessing the fourth bitcell and column select circuitry for the second write driver (e.g., second write driver 404) is not needed for accessing the first bitcell, thus reducing the area/footprint for the blast operations as well as reducing potential parasitic capacitance on the bitlines.

That is, column select circuitry is used to select the column/bitline for which bitcell of the appropriate row is written to (based on the column address). However, as described in more detail herein, instead of each write driver being coupled to the same set of all four bitlines, the first write driver is coupled to select three of the four bitline pairs and the second write driver is also coupled to select three of the four bitline pairs, where the first column select circuitry selects between a first, a second, and a third column while the second column select circuitry selects between the second, the third, and a fourth column.

In operation, a blast write operation can be performed by loading up to n words during consecutive clock cycles from an input data pin using a first storage element and an at least one additional storage element, where n is an integer greater than 1; and writing, by at least the first write driver, the up to n words to bitcells of a same row as selected by the column select circuitry. Through the described column select circuitry configurations, it is possible to write a first word and a second word (or a third word, etc.) to non-consecutive bitcells of a row.

For example, the column select circuitry selectively couples the first write driver to a bitline pair of a subset of bitlines of the set of bitlines and selectively couples the at least one additional write driver to a corresponding additional separate bitline pair of a different corresponding subset of bitlines of the set of bitlines, wherein the subset of bitlines for the first write driver and the different corresponding subset of bitlines for the at least one additional write driver are each a proper subset (i.e., a subset that contains fewer elements than the set). For the circuitry supporting n=2, the subsets are also overlapping subsets and the blast write operation includes selecting a bitline pair for one column using the first column select circuitry and selecting another bitline pair for another column using the second column select circuitry.

Thus, writing to the different bitcell locations illustrated in table 5 can be achieved by performing in one case, selecting, by the first column select circuitry, a first bitcell in the row for a first word of the two words; and selecting, by the second column select circuitry, a second bitcell in the row for a second word of the two words; performing in another case, selecting, by the first column select circuitry, a first bitcell in the row for a first word of the two words; and selecting, by the second column select circuitry, a third bitcell in the row for a second word of the two words; performing in yet another case, selecting, by the first column select circuitry, a first bitcell in the row for a first word of the two words; and selecting, by the second column select circuitry, a fourth bitcell in the row for a second word of the two words; performing in yet another case, selecting, by the first column select circuitry, a second bitcell in the row for a first word of the two words; and selecting, by the second column select circuitry, a third bitcell in the row for a second word of the two words; performing in yet another case, selecting, by the first column select circuitry, a second bitcell in the row for a first word of the two words; and selecting, by the second column select circuitry, a fourth bitcell in the row for a second word of the two words; or performing in yet another case selecting, by the first column select circuitry, a third bitcell in the row for a first word of the two words; and selecting, by the second column select circuitry, a fourth bitcell in the row for a second word of the two words.

FIG. 6 illustrates an example circuit configuration for write circuitry supporting up to two words in a blast write operation. Referring to FIG. 6, the optimization described with respect to the table of FIG. 5 can be implemented such as shown in the example circuit configuration of write circuitry 600. In particular, write circuitry 600 includes a first write driver 402 and at least one additional write driver for a set of bitlines coupled to bitcells of the memory. In this implementation, the set of bitlines are for four columns of bitlines (labeled column1, column2, column3, and column4) and the at least one additional write driver is one additional write driver (the second write driver 404).

Write circuitry 600 further includes column select circuitry coupled to the first write driver and the at least one additional write driver for selecting bitlines of the set of bitlines. In this implementation, the column select circuitry includes a first column select circuitry 622 coupled to the first write driver 402 for selecting a bitline of a first subset of the set of bitlines; and a second column select circuitry 624 coupled to the second write driver 404 for selecting a corresponding bitline of a second subset of the set of bitlines.

As can be seen, the first subset of the set of bitlines and the second subset of the set of bitlines are overlapping sets, where the overlap is for columns 2 and 3 and the first write driver 402 couples to column 1 while the second write driver 404 couples to column 4. The illustrated configuration can write one or two words at a time. When one word is written, either the first write driver 402 or the second write driver 404 is used, depending on whether the first column or the fourth column is indicated for access.

Figure 7B:
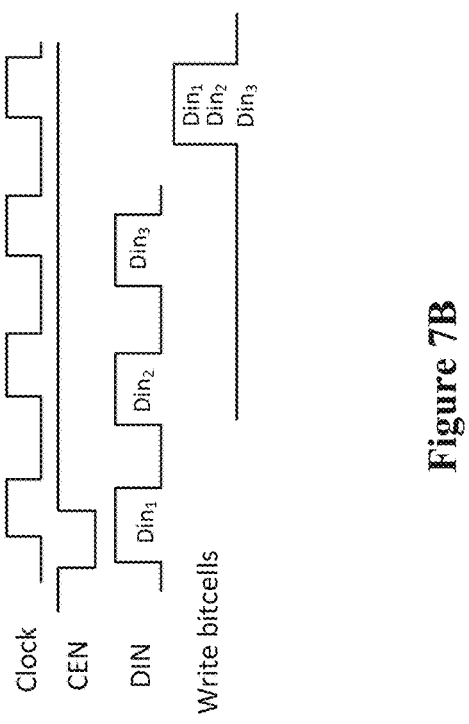
FIGS. 7A and 7B illustrate an example write circuitry supporting n=3 and corresponding timing diagram.
Figure 7A:
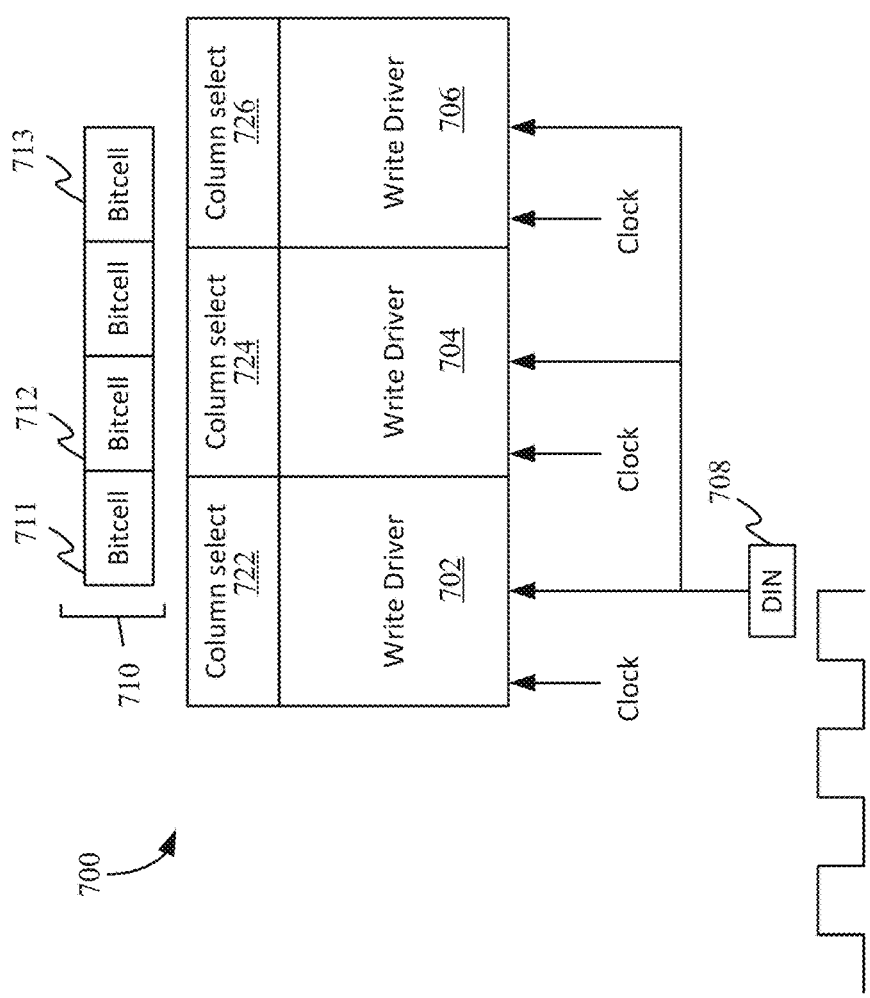

FIGS. 7A and 7B illustrate an example write circuitry supporting n=3 and corresponding timing diagram. Referring to FIG. 7A, a three-word (n=3) configuration 700 for write circuitry 125 can include a first write driver 702 to a set of bitlines, a second write driver 704 to the set of bitlines, and a third write driver 706 to the set of bitlines. The first write driver 702, the second write driver 704, and the third write driver 706 can each be selectively coupled to all the bitlines of the set of bitlines or subsets (including overlapping subsets) of the bitlines of the set of bitlines. The first write driver 702, the second write driver 704, and the third write driver 706 all receive their input through the data input (DIN) 708 for the set of bitlines. In the illustrated scenario, the three-word configuration 700 involves a selection three bitcells from four bitcells 710 in a same row that are accessible by the set of bitlines coupled to the first write driver 702, the second write driver 704, and the third write driver 706. To select between the bitcells, column select circuitry is included for each write driver. The column select circuitry can select between one, two, three, or more bitline pairs of the set of bitlines, depending on implementation.

As illustrated in FIG. 7A, the write circuitry can include a first column select circuitry 722 for selecting a particular bitline of the set of bitlines for the first write driver 702, a second column select circuitry 724 for selecting a corresponding particular bitline of the set of bitlines for the second write driver 704, and a third column select circuitry 726 for selecting a corresponding particular bitline of the set of bitlines for the third write driver 706 such that the first word is written to one bitcell (e.g., bitcell 711) coupled to the particular bitline, the second word is written to another bitcell (e.g., bitcell 712) coupled to the corresponding particular bitline, and the third word is written to yet another bitcell (e.g., bitcell 713) coupled to that corresponding particular bitline. The particular bitline selected by the first column select circuitry 722 is the selected bitline pair (i.e., bitline and bitline bar) for the first write driver 702. The corresponding particular bitlines of the second and third write driver 704, 706 selected by the second and third column select circuitry 424, 426 are the selected bitline pairs for/corresponding to the second write driver 704 and the third write driver 706, respectively. The column select circuitry (e.g., first column select circuitry 722, second column select circuitry 724, third column select circuitry 726) can be implemented as a MUX. In some cases, the column select circuitry is implemented using pass gates.

Referring to FIG. 7B, for a blast write operation, when a control circuit such as control circuit 140 of FIG. 1A receives a chip enable (CEN) signal indicating a start of the write operations for writing three words in a same row, a first word (Din1) is loaded during the first clock cycle, a second word (Din2) is loaded during the second clock cycle, and a third word (Din3) is loaded during the third clock cycle. Then, the three words (Din1, Din2, Din3) are triggered to be stored in the memory such that all three words are written by the end of the fourth clock cycle (i.e., concurrently written to memory). As can be seen, the write operations for the three words are performed in four clock cycles such that the first word (Din1) of the three words is loaded during the first clock cycle, a second word (Din2) of the three words is loaded during a second clock cycle, a third word (Din3) of the three words is loaded during a third clock cycle, and the write operations close during a fourth clock cycle during which the three words (Din1, Din2, Din3) are stored in the memory.

FIG. 8 illustrates an example circuit configuration for write circuitry supporting up to three words in a blast write operation. Referring to FIG. 8, similar to the optimization available for a circuit configuration supporting up to two words in a blast write operation, column select circuitry can be implemented in a manner where a write driver is not coupled to every column accessible by the set of bitlines. In particular, write circuitry 800 includes a first write driver 702 and at least one additional write driver for a set of bitlines coupled to bitcells of the memory. In this implementation, the set of bitlines are for four columns of bitlines (labeled column1, column2, column3, and column4) and the at least one additional write driver are two additional write drivers (the second write driver 704 and third write driver 706).

Write circuitry 800 further includes column select circuitry coupled to the first write driver and the at least one additional write driver for selecting bitlines of the set of bitlines. In this implementation, the column select circuitry includes a first column select circuitry 822 coupled to the first write driver 702 for selecting a bitline of a first subset of the set of bitlines; a second column select circuitry 824 coupled to the second write driver 704 for selecting a corresponding bitline of a second subset of the set of bitlines; and a third column select circuitry 826 coupled to the third write driver 706 for selecting a corresponding bitline of a third subset of the set of bitlines.

As can be seen the first subset and the second subset are overlapping sets, where the overlap is for column 2. In addition, the second subset and the third subset are overlapping sets, where the overlap is for column 3. The first write driver 702 couples to column 1 via the first column select circuitry 822 while the third write driver 706 couples to column 4 via the third column select circuitry 826.

When one word is written any of the three write drivers may be used. When two words are written, any two write drivers may be used, depending on the desired columns. For example, by appropriate control signals to the column select circuitry of the first column select circuitry 822, the second column select circuitry 824, and the third column select circuitry 826, the first write driver 702 and the second write driver 704 are used when column 1 and column 2 are written; the first write driver 702 and either the second write driver 704 or the third write driver 706 are used when column 1 and column 3 are written; the first write driver 702 and either the second write driver 704 or the third write driver 706 can be used when column 2 and column 3 are written or the second write driver 704 and the third write driver 706 can be used when column 2 and column 3 are written; the first write driver 702 and the third write driver 706 are used when column 1 and column 4 are written; the third write driver 706 and either the first write driver 702 or the second write driver 704 are used when column 2 and column 4 are written; and the second write driver 704 and the third write driver 706 are used when column 3 and column 4 are written.

FIG. 9 illustrates an example circuit configuration for write circuitry supporting up to four words in a blast write operation. Referring to FIG. 9, similar to the optimization available for a circuit configuration supporting up to two words and up to three words in a blast write operation, column select circuitry can be implemented in a manner where a write driver is not coupled to every column accessible by the set of bitlines. In particular, write circuitry 900 includes a first write driver 922 and at least one additional write driver for a set of bitlines coupled to bitcells of the memory. In this implementation, the set of bitlines are for four columns of bitlines (labeled column1, column2, column3, and column4) and the at least one additional write driver are three additional write drivers (the second write driver 924, third write driver 926, and fourth write driver 928). Four storage elements 912, 914, 916, 918 are provided for loading words from the DIN pin 902 in preparation for writing up to four words concurrently to the bitcells.

Write circuitry 900 further includes column select circuitry coupled to the first write driver and the at least one additional write driver for selecting bitlines of the set of bitlines. In this implementation, the column select circuitry includes a first column select circuitry 932 coupled to the first write driver 922 for selecting a bitline of a first subset of the set of bitlines; a second column select circuitry 934 coupled to the second write driver 924 for selecting a corresponding bitline of a second subset of the set of bitlines; a third column select circuitry 936 coupled to the third write driver 926 for selecting a corresponding bitline of a third subset of the set of bitlines; and a fourth column select circuitry 938 coupled to the fourth write driver 928 for selecting a corresponding bitline of a fourth subset of the set of bitlines.

As can be seen, each column select circuitry couples to one column such that the first write driver 922 couples to column 1 via the first column select circuitry 932, the second write driver 924 couples to column 2 via the second column select circuitry 934, the third write driver 926 couples to column 3 via the third column select circuitry 936, and the fourth write driver 928 couples to column 4 via the fourth column select circuitry 938.

When one word is written, the write driver that can access the desired column is used. When two words are written, any two write drivers may be used, depending on the desired columns. When three words are written, any three write drivers are used, depending on the desired columns.

Some architectures include multiple memory banks where a single write driver can be used to access the same number of columns in each of the multiple memory banks. For example, in some architectures, four sets of lines can be accessed by the single driver (e.g., 16 columns instead of just the 4 of the original example). These four sets of lines can be for two memory banks, each with duplicate banks (e.g., for 'flexible' bitlines) such as described with respect to FIG. 10.

FIG. 10 illustrates an example circuit configuration for write circuitry supporting up to two words in a blast write operation to a multiple memory bank architecture. It should be noted that while a single bitline and pass transistor is shown for each column, there exists a second pass transistor (and bitline providing bitline_bar) for each column. Referring to FIG. 10, a two-word configuration 1000 is shown in which up to two words can be loaded through a single input data pin 1002 to storage elements 1004 and 1006 that are coupled to a first write driver 1010 and at least one additional write driver (e.g., second write driver 1012). Each write driver is coupled to a first set of bitlines for a first bank of the memory and are further coupled to a second set of bitlines for a second bank of the memory. For example, the first write driver 1010 is coupled to a subset of bitlines of a set of bitlines to a top memory bank (1020) and a subset of bitlines of a set of bitlines to a bottom memory bank (1022). In some cases, the first write driver 1010 and the at least one additional write driver (e.g., second write driver 1012) are further coupled to duplicate banks of the memory (e.g., a subset of bitlines of a set of bitlines to a flexible top bank 1030 and a subset of bitlines of a set of bitlines to a flexible bottom bank 1032) such that each write driver is coupled to bitlines of up to four different banks of memory.

As can be seen, instead of duplicating 16 yw signals (flexible BL/BL*4 columns*2 banks) into 32 signals, only 8 yw signals are duplicated into 16, saving 8 signals in the CK to IO direction, where metals may be severely limited. Indeed, a control circuit is able to output twenty-four column select signals for the sixteen bitline pairs. For the local write driver node (the word data line, the effective capacitance reduces from 16 passgates (and associated routing) to 12.

Figure 11:
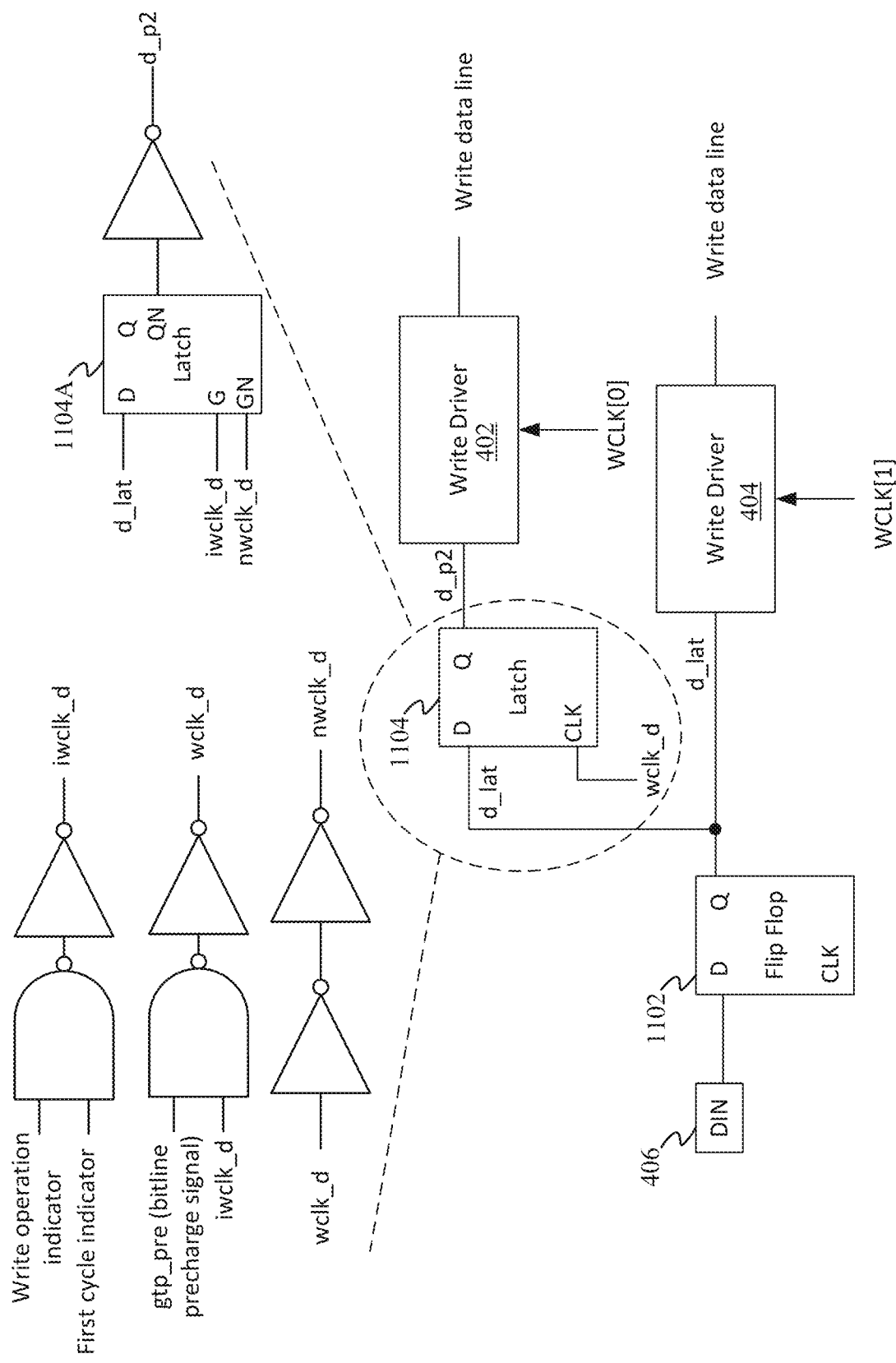
FIG. 11 illustrates an example DIN flip flop topology.

FIG. 11 illustrates an example DIN flip flop topology. As presented in FIGS. 6, 8, 9, and 10, a DIN storage element topology can be included to support the time-multiplexing of the input data. In the example DIN flip flop clock generation circuit of FIG. 11, a two-word blast write configuration is presented; however, embodiments are not limited thereto. Referring to FIG. 11 (and with reference to FIG. 6), the DIN storage elements (e.g., storage element 602 and storage element 604) can be configured as a DIN flip flop 1102 followed by a latch 1104.

For the blast write mode of the two-word blast write configuration, two data bus inputs are captured—Din1 and Din2 (see e.g., FIG. 4B), which are to be written to two columns on the same row, as determined by an address enable signal (see e.g., input to control circuit 140 of FIGS. 1A and 1B, which is used to generate the column select signals YW). Instead of doubling the width of the input bus, time-multiplexing is used.

As previously shown and described with respect to FIG. 4B, the $1^{st}$ word (DIN1) can be captured off the $1^{st}$ edge of the CLK, and the $2^{nd}$ word (DIN2) can be captured off the 2nd edge of the CLK. Both data inputs are then stored and written into the memory starting on the $2^{nd}$ edge of the clock and finishing on the $3^{rd}$ edge.

As shown in FIG. 11, the d_lat signal is the output of the flip flop 1102, which is also used as the input to the second write driver 404. The d_p2 is the output of the extra latch added (latch 1104), which is used as the input to the first write driver 402. In blast write mode (with the address enable indicating columns for the two words being written), Din1 will be saved in the $1^{st}$ cycle to both the D flip flop 1102 and the latch 1104 so that it can be used as the $1^{st}$ word for the write operation. In the $2^{nd}$ cycle, the latch will remain closed, and d_lat will be updated with Din2 (via D flip flop 1102) so that it can be used as the $2^{nd}$ word for the $2^{nd}$ write operation. This configuration works for the non-blast write mode because in non-blast write mode, d_p2 will become the same as d_lat in the $1^{st}$ cycle, so both write drivers will get the same input, whichever may be used (depending on the column address—since first write driver can access the first column and the second write driver can access the fourth column, but not vice versa).

To support the above described operation of the data input, a latch-clock is generated in a manner shown in the inset such that the clock to the latch (1104A) is generated in the 1st cycle to capture Din1 coming from the flip-flop, and it is not triggered after that, so that the data is stored and the latch 1104A stays opaque. In the $2^{nd}$ cycle, the flip-flop accepts the next data bit and that data bit comes to the node d_lat (i.e., the input of the latch 1104/1104A), but is never accepted inside the latch. This gives a low-cost solution to have two data bit information—one in d_p2 and one in d_lat, so that two write drivers can simultaneously use this to perform the write operation.

The clock control for the latch is generated by using a bitline precharge signal of a write operation. In the example configuration shown in the inset of FIG. 11 for latch 1104A, the clock control signal is generated by using a bitline precharge signal that is generated in an initial clock cycle and combined with a signal labeled iwclk_d. The iwclk_d signal is a signal that goes high if this is a write operation (determined by a write operation indicator and if it is the $1^{st}$ cycle of the operation (determined by a first cycle indicator). The latch pulse is as wide as the bitline precharge signal, which is a sufficient amount of time for the latch to accept the output of the flip-flop.

Figure 12:
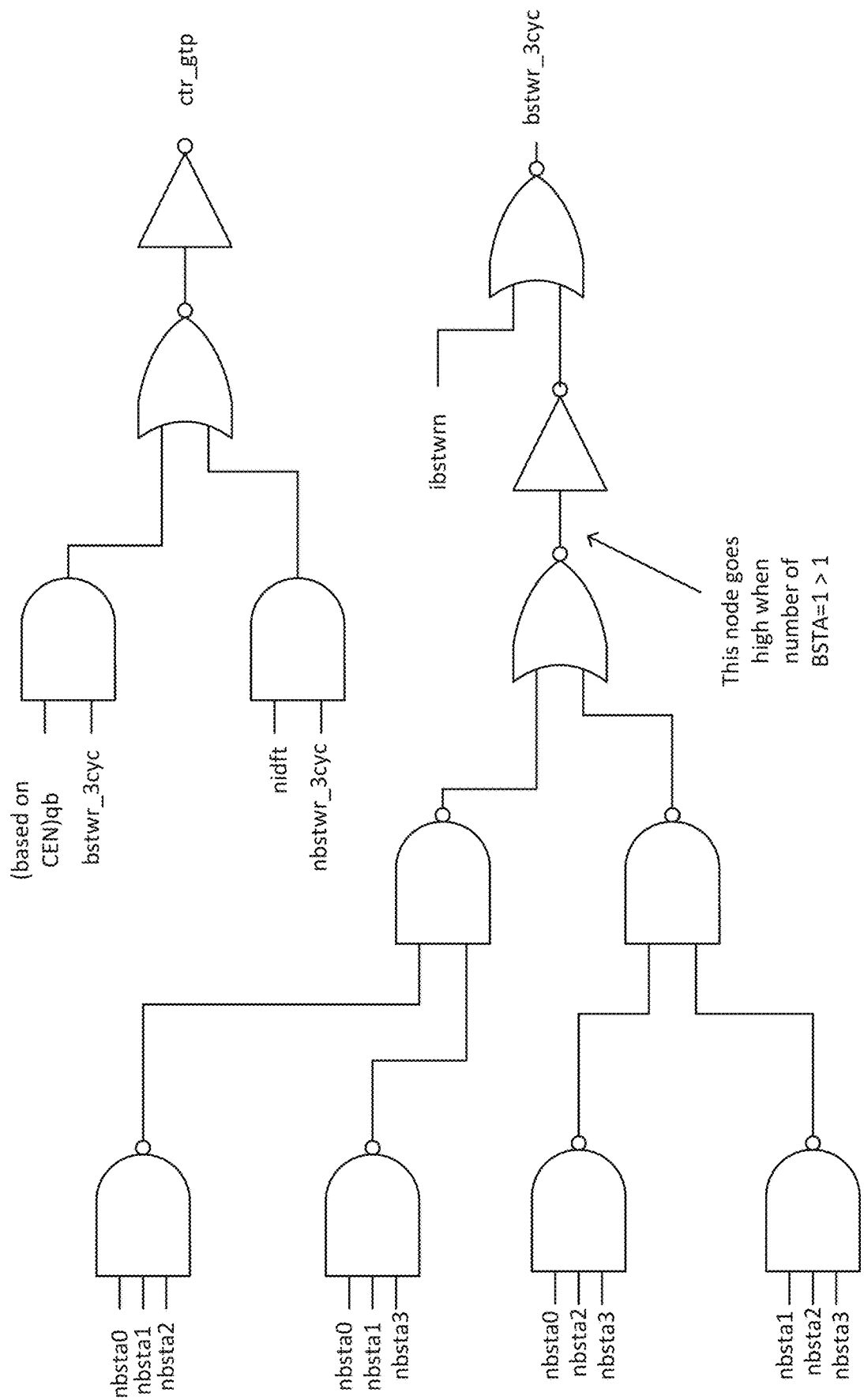
FIGS. 12 and 13 show circuitry for selective detection of a first cycle in a blast write operation.
Figure 13:
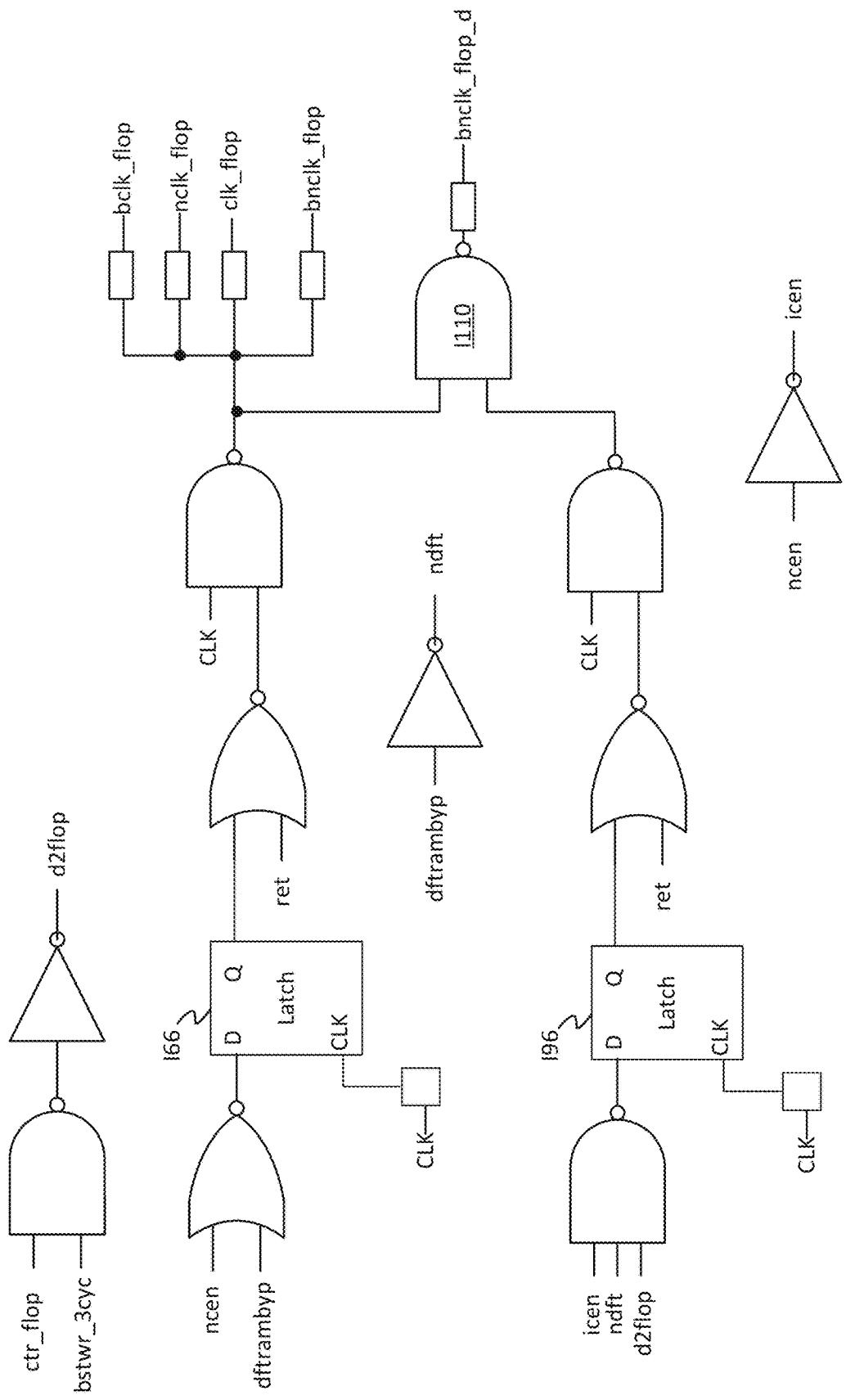

FIGS. 12 and 13 show circuitry for selective detection of a first cycle in a blast write operation. For the blast write mode, by detecting this mode of operation in the $1^{st}$ cycle of operation early, the following objectives can be achieved: GTP (local clock) is suppressed in this cycle, since the 1st cycle is only for capturing Din1 (i.e., the data to be written to the $1^{st}$ column as selected by BSTA); and the same D flip-flop needs to be triggered again in the $2^{nd}$ cycle to capture Din2 (i.e., the data to be written to the $2^{nd}$ column as selected by BSTA), etc., as described with respect to FIGS. 4B, 7B, and 8-10.

Referring to FIG. 12, for suppressing GTP in the first cycle of a two-word blast write configuration, a signal bstwr_3cyc determines if this is a 3-cycle blast operation, and sequences the correct value of CTR i.e., either qb or nidft, to the gtp generator. In DFT=0 mode, nidft stays 1, so this is the default mode when the GTP is to be generated. QB has the characteristic that it is one flip-flop after CEN (and with the opposite polarity). Therefore, it goes high in the $2^{nd}$ cycle, and stays high until the next active operation. Thus, this signal is useful for suppressing GTP in the $1^{st}$ cycle of a blast write, and then generating GTP in the $2^{nd}$ cycle, which is the sequence that can be used for blast write as described with respect to FIGS. 4A and 4B.

Referring to FIG. 13, for triggering the same D flip-flop, the signal d2flop goes high off the $1^{st}$ edge of the CLK, when ctr_flop rises (only if CEN=0, which confirms that this is the $1^{st}$ edge of the CLK). This signal is then latched by external CLK so that if CEN=1, DFT=0 and D2FLOP=1, the clock for the D flip-flops is generated once again. This is exactly as required, because this set of inputs indicate that this is the $2^{nd}$ cycle of a blast write operation, and a new data has to be read in to the D flip flop.

Off the $2^{nd}$ edge of the CLK, the signal d2flop does fall (since ctr_flop goes to 0), but this does not affect the circuit's operation, because of the latch 196 that is implemented on the CLK. Thus, this circuit is robust and does not have any sensitive margins associated with it (in other words, it takes a very long time for d2flop to fall relative to CLK arrival and latch closure, so the hold time is very safe by construction).

The $1^{st}$ edge of the CLK also drives the same D flip-flop clock, so an OR of these two sources of CLK is implemented by the NAND 1110. In the 1st cycle, the upper latch (166) drives bnclk_flop_d, and in the $2^{nd}$ cycle, the lower latch (196) drives bnclk_flop_d.

Certain embodiments of the illustrated methods and memory circuitry include the following.

Clause 1. A write circuitry for a memory, comprising: a first write driver and at least one additional write driver for a set of bitlines coupled to bitcells of the memory; column select circuitry coupled to the first write driver and the at least one additional write driver for selecting bitlines of the set of bitlines; a first storage element coupled to an input data pin to receive data for storing in the memory; and at least one additional storage element coupled in series with the first storage element, wherein the first storage element and each of the at least one additional storage element are also coupled to output to a corresponding write driver of the first write driver and the at least one additional write driver for the set of bitlines.

Clause 2. The write circuitry of clause 1, wherein the column select circuitry comprises a plurality of pass gates coupled, wherein each pass gate is coupled to a corresponding bitline of the set of bitlines.

Clause 3. The write circuitry of clause 1 or 2, wherein the column select circuitry comprises: a first column select circuitry coupled to the first write driver for selecting a bitline of a first subset of the set of bitlines; and a second column select circuitry coupled to one of the at least one additional write driver for selecting a corresponding bitline of a second subset of the set of bitlines, wherein the first subset and the second subset are overlapping sets.

Clause 4. The write circuitry of any preceding clause, wherein the first subset of the set of bitlines and the second subset of the set of bitlines overlap by at least two bitline pairs of the set of bitlines.

Clause 5. The write circuitry of any preceding clause, wherein the column select circuitry further comprises: a third column select circuitry coupled to a second one of the at least one additional write driver for selecting a corresponding bitline of a third subset of the set of bitlines, wherein the second subset and the third subset are overlapping sets.

Clause 6. The write circuitry of any of clauses 1-3 and 5, wherein the first subset and the second subset overlap by at least one bitline of the set of bitlines; and wherein the second subset and the third subset overlap by at least one bitline of the set of bitlines.

Clause 7. The write circuitry of any preceding clause, wherein the column select circuitry comprises: a first column select circuitry coupled to the first write driver for selecting a bitline of a first subset of the set of bitlines; and an additional column select circuitry for each of the at least one additional write driver for selecting corresponding bitlines of corresponding subsets of the set of bitlines.

Clause 8. The write circuitry of clause 7, wherein the set of bitlines correspond to p columns, where p is an integer greater than 1, wherein the first write driver and the at least one additional write driver includes up to p write drivers with a corresponding number of column select circuitry.

Clause 9. The write circuitry of any preceding clause, wherein the first write driver and the at least one additional write driver are further coupled to a second set of bitlines for a second bank of the memory.

Clause 10. The write circuitry of clause 9, wherein the first write driver and the at least one additional write driver are further coupled to duplicate banks of the memory such that each write driver is coupled to bitlines of up to four different banks of memory.

Clause 11. The write circuitry of any preceding clause, wherein the first storage element is a flip flop and the at least one additional storage element is one latch, wherein the latch has a clock signal generated from a bitline precharge signal of a write operation.

Clause 12. A method of operating a memory circuitry according to any preceding clause, the memory circuitry comprising write circuitry that comprises a first write driver and at least one additional write driver for a set of bitlines coupled to bitcells of the memory; column select circuitry coupled to the first write driver and the at least one additional write driver for selecting bitlines of the set of bitlines; a first storage element coupled to an input data pin to receive data for storing in the memory; and at least one additional storage element coupled in series with the first storage element, wherein the first storage element and each of the at least one additional storage element are also coupled to output to a corresponding write driver of the first write driver and the at least one additional write driver for the set of bitlines, the method comprising: loading up to n words during consecutive clock cycles from an input data pin using the first storage element and the at least one additional storage element, where n is an integer greater than 1; and writing, by at least the first write driver, the up to n words to bitcells of a same row as selected by the column select circuitry.

Clause 13. The method of clause 12, wherein the column select circuitry selectively couples the first write driver to a bitline pair of a subset of bitlines of the set of bitlines and selectively couples the at least one additional write driver to a corresponding additional separate bitline pair of a different corresponding subset of bitlines of the set of bitlines, wherein the subset of bitlines for the first write driver and the different corresponding subset of bitlines for the at least one additional write driver are each a proper subset.

Clause 14. The method of clause 12 or 13, wherein the at least one additional write driver is one additional write driver, wherein two words are loaded during the consecutive clock cycles and the two words are written by the first write driver and the one additional write driver, wherein the column select circuitry comprises a first column select circuitry that selectively couples the first write driver to the bitline pair of the subset of bitlines of the set of bitlines and a second column select circuitry that selectively couples the one additional write driver to the corresponding additional separate bitline pair of the different corresponding subset of bitlines of the set of bitlines, wherein the subset of bitlines for the first write driver and the different corresponding subset of bitlines for the one additional write driver are overlapping subsets, wherein the method further comprises: selecting a bitline pair for one column using the first column select circuitry and selecting another bitline pair for another column using the second column select circuitry.

Clause 15. The method of any preceding method clause, wherein selecting the bitline pair for the one column using the first column select circuitry and selecting the other bitline pair for the other column using the second column select circuitry comprises: selecting, by the first column select circuitry, a first bitcell in the row for a first word of the two words; and selecting, by the second column select circuitry, a second bitcell in the row for a second word of the two words.

Clause 16. The method of any preceding method clause, wherein selecting the bitline pair for the one column using the first column select circuitry and selecting the other bitline pair for the other column using the second column select circuitry comprises: selecting, by the first column select circuitry, a first bitcell in the row for a first word of the two words; and selecting, by the second column select circuitry, a third bitcell in the row for a second word of the two words.

Clause 17. The method of any preceding method clause, wherein selecting the bitline pair for the one column using the first column select circuitry and selecting the other bitline pair for the other column using the second column select circuitry comprises: selecting, by the first column select circuitry, a first bitcell in the row for a first word of the two words; and selecting, by the second column select circuitry, a fourth bitcell in the row for a second word of the two words.

Clause 18. The method of any preceding method clause, wherein selecting the bitline pair for the one column using the first column select circuitry and selecting the other bitline pair for the other column using the second column select circuitry comprises: selecting, by the first column select circuitry, a second bitcell in the row for a first word of the two words; and selecting, by the second column select circuitry, a third bitcell in the row for a second word of the two words.

Clause 19. The method of any preceding method clause, wherein selecting the bitline pair for the one column using the first column select circuitry and selecting the other bitline pair for the other column using the second column select circuitry comprises: selecting, by the first column select circuitry, a second bitcell in the row for a first word of the two words; and selecting, by the second column select circuitry, a fourth bitcell in the row for a second word of the two words.

Clause 20. The method of any preceding method clause, wherein selecting the bitline pair for the one column using the first column select circuitry and selecting the other bitline pair for the other column using the second column select circuitry comprises: selecting, by the first column select circuitry, a third bitcell in the row for a first word of the two words; and selecting, by the second column select circuitry, a fourth bitcell in the row for a second word of the two words.

Although the subject matter has been described in language specific to structural features and/or acts, it is to be understood that the subject matter defined in the appended claims is not necessarily limited to the specific features or acts described above. Rather, the specific features and acts described above are disclosed as examples of implementing the claims and other equivalent features and acts that would be recognized by one skilled in the art are intended to be within the scope of the claims.

What is claimed is:

1. A write circuitry for a memory, comprising:
   a first write driver and at least one additional write driver for a set of bitlines coupled to bitcells of the memory;
   column select circuitry coupled to the first write driver and the at least one additional write driver for selecting bitlines of the set of bitlines;
   a first storage element coupled to an input data pin to receive data for storing in the memory; and
   at least one additional storage element coupled in series with the first storage element, wherein the first storage element and each of the at least one additional storage element are also coupled to output to a corresponding write driver of the first write driver and the at least one additional write driver for the set of bitlines.

2. The write circuitry of claim 1, wherein the column select circuitry comprises a plurality of pass gates, wherein each pass gate is coupled to a corresponding bitline of the set of bitlines.

3. The write circuitry of claim 1, wherein the column select circuitry comprises:
   a first column select circuitry coupled to the first write driver for selecting a bitline of a first subset of the set of bitlines; and
   a second column select circuitry coupled to one of the at least one additional write driver for selecting a corresponding bitline of a second subset of the set of bitlines, wherein the first subset and the second subset are overlapping sets.

4. The write circuitry of claim 3, wherein the first subset of the set of bitlines and the second subset of the set of bitlines overlap by at least two bitline pairs of the set of bitlines.

5. The write circuitry of claim 3, wherein the column select circuitry further comprises:
   a third column select circuitry coupled to a second one of the at least one additional write driver for selecting a corresponding bitline of a third subset of the set of bitlines, wherein the second subset and the third subset are overlapping sets.

6. The write circuitry of claim 5, wherein the first subset and the second subset overlap by at least one bitline of the set of bitlines; and wherein the second subset and the third subset overlap by at least one bitline of the set of bitlines.

7. The write circuitry of claim 1, wherein the column select circuitry comprises:
   a first column select circuitry coupled to the first write driver for selecting a bitline of a first subset of the set of bitlines; and
   an additional column select circuitry for each of the at least one additional write driver for selecting corresponding bitlines of corresponding subsets of the set of bitlines.

8. The write circuitry of claim 7, wherein the set of bitlines correspond to p columns, where p is an integer greater than 1, wherein the first write driver and the at least one additional write driver includes up to p write drivers with a corresponding number of column select circuitry.

9. The write circuitry of claim 1, wherein the first write driver and the at least one additional write driver are further coupled to a second set of bitlines for a second bank of the memory.

10. The write circuitry of claim 9, wherein the first write driver and the at least one additional write driver are further coupled to duplicate banks of the memory such that each write driver is coupled to bitlines of up to four different banks of memory.

11. The write circuitry of claim 1, wherein the first storage element is a flip flop and the at least one additional storage element is one latch, wherein the latch has a clock signal generated from a bitline precharge signal of a write operation.

12. A method of operating a memory circuitry comprising write circuitry that comprises a first write driver and at least one additional write driver for a set of bitlines coupled to bitcells of the memory; column select circuitry coupled to the first write driver and the at least one additional write driver for selecting bitlines of the set of bitlines; a first storage element coupled to an input data pin to receive data for storing in the memory; and at least one additional storage element coupled in series with the first storage element, wherein the first storage element and each of the at least one additional storage element are also coupled to output to a corresponding write driver of the first write driver and the at least one additional write driver for the set of bitlines, the method comprising:
    loading up to n words during consecutive clock cycles from an input data pin using the first storage element and the at least one additional storage element, where n is an integer greater than 1; and
    writing, by at least the first write driver, the up to n words to bitcells of a same row as selected by the column select circuitry.

13. The method of claim 12, wherein the column select circuitry selectively couples the first write driver to a bitline pair of a subset of bitlines of the set of bitlines and selectively couples the at least one additional write driver to a corresponding additional separate bitline pair of a different corresponding subset of bitlines of the set of bitlines,
    wherein the subset of bitlines for the first write driver and the different corresponding subset of bitlines for the at least one additional write driver are each a proper subset.

14. The method of claim 13, wherein the at least one additional write driver is one additional write driver, wherein two words are loaded during the consecutive clock cycles and the two words are written by the first write driver and the one additional write driver,
    wherein the column select circuitry comprises a first column select circuitry that selectively couples the first write driver to the bitline pair of the subset of bitlines of the set of bitlines and a second column select circuitry that selectively couples the one additional write driver to the corresponding additional separate bitline pair of the different corresponding subset of bitlines of the set of bitlines, wherein the subset of bitlines for the first write driver and the different corresponding subset of bitlines for the one additional write driver are overlapping subsets, wherein the method further comprises:
    selecting a bitline pair for one column using the first column select circuitry and selecting another bitline pair for another column using the second column select circuitry.

15. The method of claim 14, wherein selecting the bitline pair for the one column using the first column select circuitry and selecting the other bitline pair for the other column using the second column select circuitry comprises:
    selecting, by the first column select circuitry, a first bitcell in the row for a first word of the two words; and
    selecting, by the second column select circuitry, a second bitcell in the row for a second word of the two words.

16. The method of claim 14, wherein selecting the bitline pair for the one column using the first column select circuitry and selecting the other bitline pair for the other column using the second column select circuitry comprises:
    selecting, by the first column select circuitry, a first bitcell in the row for a first word of the two words; and
    selecting, by the second column select circuitry, a third bitcell in the row for a second word of the two words.

17. The method of claim 14, wherein selecting the bitline pair for the one column using the first column select circuitry and selecting the other bitline pair for the other column using the second column select circuitry comprises:
    selecting, by the first column select circuitry, a first bitcell in the row for a first word of the two words; and
    selecting, by the second column select circuitry, a fourth bitcell in the row for a second word of the two words.

18. The method of claim 14, wherein selecting the bitline pair for the one column using the first column select circuitry and selecting the other bitline pair for the other column using the second column select circuitry comprises:
    selecting, by the first column select circuitry, a second bitcell in the row for a first word of the two words; and
    selecting, by the second column select circuitry, a third bitcell in the row for a second word of the two words.

19. The method of claim 14, wherein selecting the bitline pair for the one column using the first column select circuitry and selecting the other bitline pair for the other column using the second column select circuitry comprises:
    selecting, by the first column select circuitry, a second bitcell in the row for a first word of the two words; and
    selecting, by the second column select circuitry, a fourth bitcell in the row for a second word of the two words.

20. The method of claim 14, wherein selecting the bitline pair for the one column using the first column select circuitry and selecting the other bitline pair for the other column using the second column select circuitry comprises:
    selecting, by the first column select circuitry, a third bitcell in the row for a first word of the two words; and
    selecting, by the second column select circuitry, a fourth bitcell in the row for a second word of the two words.

* * * * *